United States Patent
Baldemair

(10) Patent No.: US 10,439,853 B2
(45) Date of Patent: Oct. 8, 2019

(54) TIME DOMAIN IN CONTINUOUS DFT-S-OFDM FOR SIDELOBES REDUCTION

(71) Applicant: Telefonaktiebolaget LM Ericsson (publ), Stockholm (SE)

(72) Inventor: Robert Baldemair, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 15/566,428

(22) PCT Filed: Apr. 16, 2015

(86) PCT No.: PCT/EP2015/058312
§ 371 (c)(1),
(2) Date: Oct. 13, 2017

(87) PCT Pub. No.: WO2016/165769
PCT Pub. Date: Oct. 20, 2016

(65) Prior Publication Data
US 2018/0241600 A1 Aug. 23, 2018

(51) Int. Cl.
*H04L 27/26* (2006.01)

(52) U.S. Cl.
CPC ........ *H04L 27/2607* (2013.01); *H04L 27/264* (2013.01); *H04L 27/2636* (2013.01)

(58) Field of Classification Search
CPC ............. H04L 27/2607; H04L 27/2636; H04L 27/264
USPC ........................................................ 375/260
See application file for complete search history.

(56) References Cited

U.S. PATENT DOCUMENTS

| 2003/0193889 A1* | 10/2003 | Jacobsen | H04L 27/2608 370/208 |
| 2007/0263746 A1* | 11/2007 | Son | H04L 1/0618 375/267 |
| 2008/0225819 A1* | 9/2008 | Niu | H03M 13/05 370/342 |
| 2011/0051830 A1* | 3/2011 | Tsao | H04L 27/2657 375/261 |
| 2012/0321260 A1* | 12/2012 | Messerly | C03B 37/01211 385/123 |
| 2013/0083778 A1* | 4/2013 | Wang | H04L 1/0026 370/335 |
| 2014/0029511 A1* | 1/2014 | Park | H04L 27/2631 370/328 |

(Continued)

OTHER PUBLICATIONS

Van De Beek, J. et al., "N-continuous OFDM", IEEE Communications Letters, Jan. 2009, pp. 1-3, vol. 13, No. 1.

(Continued)

*Primary Examiner* — Michael R Neff
(74) *Attorney, Agent, or Firm* — Patent Portfolio Builders, PLLC

(57) ABSTRACT

Goal of the application is providing an alternative to the N-continuous algorithm in frequency domain for sidelobes reduction (OOB) suitable for SC-FDMA. A part of the time domain symbols is used as correction signal to ensure continuity of the signal and its derivatives at symbol boundaries, ie between previous symbol and guard interval (can be Zero Padding or Cyclic Pre-fix) of current symbol. Said time domain symbols are then FFT precoded, windowed, followed by IFFT and Guard Interval insertion. Also applied to FBMC.

18 Claims, 6 Drawing Sheets

(56) References Cited

U.S. PATENT DOCUMENTS

2018/0123832 A1\* 5/2018 Blanksby .................. H04L 1/00

OTHER PUBLICATIONS

Van De Beek, J. et al., "EVM-constrained OFDM precoding for reduction of out-of-band emission", IEEE 70th Vehicular Technology Conference, Sep. 20-23, 2009, pp. 1-5.
Michailow, N. et al., "Generalized Frequency Division Multiplexing for 5th Generation Cellular Networks", IEEE Transactions on Communications, Sep. 2014, pp. 3045-3061, vol. 62, No. 9.
Wei, P. et al., "A Low-Complexity Time-Domain Signal Processing Algorithm for N-continuous OFDM", IEEE International Conference on Communications, Jun. 9-13, 2013, pp. 5754-5758.
Jiang Y. et al., "A New Out-of-Band Power Suppression Scheme by Extending Effective Cyclic-Prefix of OFDM", IEEE 71st Vehicular Technology Conference, May 16-19, 2010, pp. 1-6.
Hasegawa, F. et al., "Novel Dynamic and Static Methods for Out-of-Band Power Suppression in SC-OFDM", IEEE Wireless Communications Letters, Jun. 2015, pp. 313-316, vol. 4, No. 3.

\* cited by examiner

100

200

1000

1100

TIME DOMAIN IN CONTINUOUS DFT-S-OFDM FOR SIDELOBES REDUCTION

TECHNICAL FIELD

The present disclosure generally relates to a technique for generating a transmission block for a radio transmission. More specifically, and without limitation, a device and a method are provided for generating a transmission block for a continuous precoded multi-carrier transmission.

BACKGROUND

Multi-carrier modulation, such as Orthogonal Frequency-Division Multiplexing (OFDM), are widely used and became indispensible for the physical layer of digital communication. However, out-of-band emissions are created due to signal jumps at OFDM symbol boundaries. For example, an OFDM symbol $y_i(t)$ with N subcarriers transmitted at transmission block i has a time duration $T=N \cdot T_s$ for a sampling rate $1/T_s$. The OFDM symbol is periodic with periodicity T. Particularly, $y(0)=y(T)$ holds. A subsequent OFDM symbol transmitted during transmission block i+1 is $y_{i+1}(t)$. At time T, the signal jumps from $y_i(T)$ to $y_{i+1}(0)$, i.e., a signal discontinuity occurs.

A conventional technique to avoid these jumps is proposed in article "EVM-constrained OFDM precoding for reduction of out-of-band emission" by J. van de Beek and F. Berggren, VTC Fall 2009, 20-23 Sep. 2009; and article "N-continuous OFDM" by J. van de Beek and F. Berggren, IEEE Commun. Lett., vol. 13, no. 1, pp. 1-3, Jan. 2009. In an OFDM system the data to be transmitted is applied in the frequency domain. The conventional technique superposes to the frequency-domain data x (i.e., a vector of frequency-domain symbols applied to an OFDM modulator) a correction signal c. Instead of data vector x, a vector x+c is transmitted. However, the correction signal c has to be much smaller than x, in order to allow a receiver to recover x even though x+c has been transmitted.

Pre-coded multi-carrier signaling also suffers from out-of-band emissions created by discontinuities at precoded multi-carrier transmission block boundaries. The conventional technique is not applicable to pre-coded multi-carrier signaling, e.g. since the data is applied in the time-domain (and not in frequency-domain). Applying the conventional technique to precoded multi-carrier systems would unpredictably affect the data to be transmitted, since the correction signal c of the conventional technique would be transformed into the time-domain. The transformed correction signal superposes the data with peaks much larger than some data symbols, so that recovery of these symbols is impossible.

SUMMARY

Accordingly, there is a need for a technique that allows reducing out-of-band emissions of precoded multi-carrier transmissions in at least certain situations.

As to one aspect, a device for generating a transmission block for a precoded multi-carrier radio transmission is provided. The device comprises at least one processor configured for, or configured to trigger, providing a symbol, the symbol including a plurality of symbol elements, wherein a subset of the symbol elements is set to values depending on a boundary condition for the transmission block; precoding the symbol; and generating the transmission block by multi-carrier modulation of the precoded symbol.

By setting the symbol elements in the subset, the data may be carried by symbol elements not in the subset, so that the generated transmission block fulfills the boundary condition without affecting the data to be transmitted. In at least some embodiments, by setting the symbol elements in the subset, the generated transmission block can fulfill the boundary condition at least approximately. The symbol provision may be transparent for the precoding and the multi-carrier modulation. The precoding may be adapted to the multi-carrier modulation.

The symbol elements in the subset may be set as a function of the data symbol elements in fulfillment of the boundary condition. The boundary condition may relate to a boundary value of the transmission block at the boundary and optionally to one or more signal derivatives of the transmission block at the boundary.

The boundary condition may specify that the boundary value and optionally the one or more signal derivatives are continuous at the boundary. The boundary condition may specify that the boundary value and optionally the one or more signal derivatives are equal to zero at the boundary.

The transmission block may be transmitted on an uplink channel of a radio access network, e.g., to a radio access point or a radio base station. The device may be implemented by a user equipment configured to access the radio access network. A cellular telecommunications network may provide the radio access network. Alternatively or in addition, the device may be implemented by the access point or the radio base station.

The precoding may be performed (e.g., exclusively) in the frequency domain. The boundary condition may relate to a boundary of the transmission block in the time domain.

The symbol elements in the subset may be set to values that are determined by the boundary condition. The subset may be a proper subset. At least some or all of the symbol elements that are not in the subset may be set to values independent of the boundary condition.

The multi-carrier modulation may include an Orthogonal Frequency-Division Multiplexing (OFDM) modulation and/or a Filter Bank Multi-Carrier (FBMC) modulation. The precoding may include a Discrete Fourier Transform (DFT) and/or a Filter Bank Transform (FBT).

The precoding may include a spectral analysis. The multi-carrier modulation may include a spectral synthesis. The subset may include symbol elements adjacent to a boundary of the symbol.

A cyclic prefix may be inserted between a previous transmission block and the generated transmission block. The boundary condition may relate to a boundary between the previous transmission block and the cyclic prefix.

Alternatively or in addition, the radio transmission may be muted in a guard interval. The boundary condition may relate to a boundary between the transmission block and the muted guard interval.

The boundary condition may relate to the boundary value of the transmission block at the boundary in the time domain. In addition, the boundary condition may relate to one or more signal derivatives of the transmission block at the boundary in the time domain. The number of symbol elements in the subset may be equal to 1 or more, e.g., 1 plus the number of the one or more signal derivatives.

The values of the symbol elements in the subset may be determined by least squares analysis of the boundary value and, optionally, the one or more signal derivatives of the transmission block at the boundary.

The symbol may be representable by a vector $$x = \begin{pmatrix} x_d \\ x_c \end{pmatrix}$$

including the symbols elements $x_c$ in the subset. The values of the symbol elements $x_c$ in the subset may be computed according to $$x_c = -(MP_c)^\# MP_d x_d,$$

wherein "#" denotes an inverse or a pseudoinverse. An action of the precoding on the symbol elements inside and outside of the subset may be representable by matrices $P_c$ and $P_d$, respectively. A boundary value and, optionally, one or more signal derivatives at the boundary of the multi-carrier modulation may be representable by a matrix M, e.g., M=GS. The multi-carrier modulation may include a mapping to subcarriers. The mapping may be representable by a matrix S. The matrix G may transform a frequency-domain vector to its boundary value and one or more signal derivatives at the boundary. The computation of the values of the symbol elements $x_c$ in the subset may use the pseudoinverse or inverse.

The precoding may be representable by $P_i = \Delta \Phi F_i$, for i=c, d. The precoding may further include a cyclic extension and a windowing filter representable by matrices $\Phi$ and $\Delta$, respectively.

Data to be transmitted may be encoded in symbol elements outside of the subset. The data may be encoded by a channel code providing forward error correction. As to another aspect, a method of generating a transmission block for a precoded multi-carrier radio transmission is provided. The method comprises a step of providing a symbol, the symbol including a plurality of symbol elements, wherein a subset of the symbol elements is set to values depending on a boundary condition for the transmission block; a step of precoding the symbol; and a step of generating the transmission block by multi-carrier modulation of the precoded symbol.

The method may further include any feature and/or any corresponding steps disclosed in the context of the device aspect (including user equipment aspects and/or network node aspects).

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the mobile telecommunications network and/or the Internet.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as specific modulators in order to provide a thorough understanding of the technique disclosed herein. It will be apparent to one skilled in the art that the technique may be practiced using any multi-carrier modulator or in other embodiments that depart from these specific details. Moreover, while the following embodiments are primarily described for 3GPP Long Term Evolution (LTE), LTE-Advanced (or 4G) and 5G implementations, it is readily apparent that the technique described herein may also be implemented in any other radio access technology, including a Wireless Local Area Network (WLAN) according to the standard family IEEE 802.11 or a Worldwide Interoperability for Microwave Access (WiMAX) according to the standard family IEEE 802.16. The technique is further applicable to wired access techniques including Orthogonal Frequency Division Multiplexing (OFDM) or Discrete Multi-Tone (DMT) modulation, e.g., for an Asymmetric Digital Subscriber Line (ADSL). The technique is also applicable to broadcasting techniques including Digital Video Broadcasting (DVB) and Digital Audio Broadcasting (DAB).

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
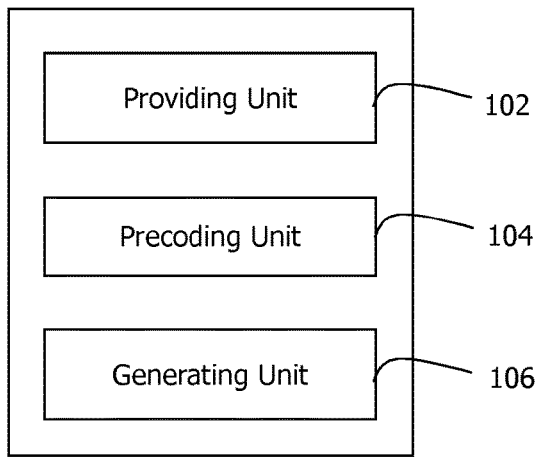
FIG. 1 illustrates a schematic block diagram of a device for generating a transmission block.

FIG. 1 schematically illustrates a block diagram of a device 100 for generating a transmission block for a pre-coded multi-carrier radio transmission. The device 100 comprises a providing unit 102 for providing a symbol to be transmitted by the transmission block. The symbol includes a plurality of symbol elements, wherein a subset of the symbol elements is set to values depending on a boundary condition for the transmission block to be transmitted. The device 100 further comprises a precoding unit 104 for precoding the provided symbol. A generating unit 106 generates the transmission block by multi-carrier modulation of the precoded symbol.

Figure 2:
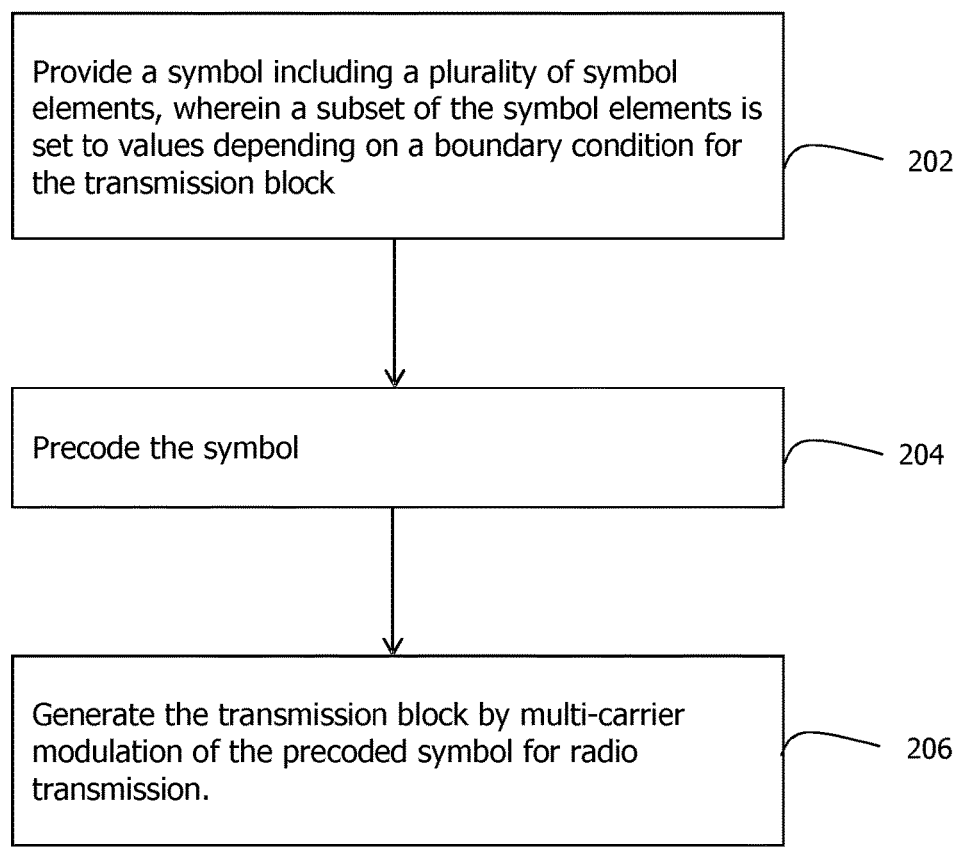
FIG. 2 shows a flowchart for a method of generating a transmission block, which is performable by the device of FIG. 1.

FIG. 2 shows a flowchart for a method 200 of generating a transmission block for a precoded multi-carrier radio transmission. The method 200 comprises a step 202 of providing a symbol. The symbol includes a plurality of symbol elements, wherein a subset of the symbol elements is set to values depending on a boundary condition for the transmission block. The symbol is precoded in a step 204. In a step 206, the transmission block is generated by multi-carrier modulation of the precoded symbol.

The units 102, 104 and 106 may perform the steps 202, 204 and 206, respectively. The method 200 may be implemented by a user equipment or equipment for machine-type communications (MTC). The user equipment may be a mobile phone or tablet computer. The MTC equipment may include a sensor and/or an actuator. The user equipment or MTC equipment may be configured for wireless communication with a Radio Access Network (RAN). Alternatively or in addition, the method 200 may be implemented by a node of a telecommunications network, e.g., the RAN. The node may include a radio base station, an access node or a relay.

The boundary condition specifies the symbol elements in the subset as a function of symbol elements outside of the subset. The symbol elements in the subset are also referred to as correction symbol elements. The symbol elements outside of the subset are also referred to as data symbol elements. The boundary condition does not specify or change the data symbol elements.

The technique allows constructing precoded multi-carrier signals that are continues across precoded multi-carrier transmission block boundaries according to the boundary condition. E.g., the previous transmission block or a fixed-valued guard interval may determine the boundary.

"Continuity" at the boundary, as used herein, may relate to the signal itself and, optionally, one or more derivatives of the signal in the time-domain. The continuity at the boundary is achieved, at least approximately, by setting some of the symbol elements (namely, the symbol elements defining the subset) of the symbol provided for the precoded multi-carrier transmission to values determined by the boundary condition. The boundary condition may require reducing or avoiding discontinuities across boundaries, which allows reducing out-of-band emissions.

Optionally, a guard interval is added, e.g. as a prefix, to the transmission block. The transmission block is up-converted from the baseband signal to a radio-frequency signal according to a carrier frequency. The radio frequency signal is input to a power amplifier connected to one or more transmit antennas.

Figure 3:
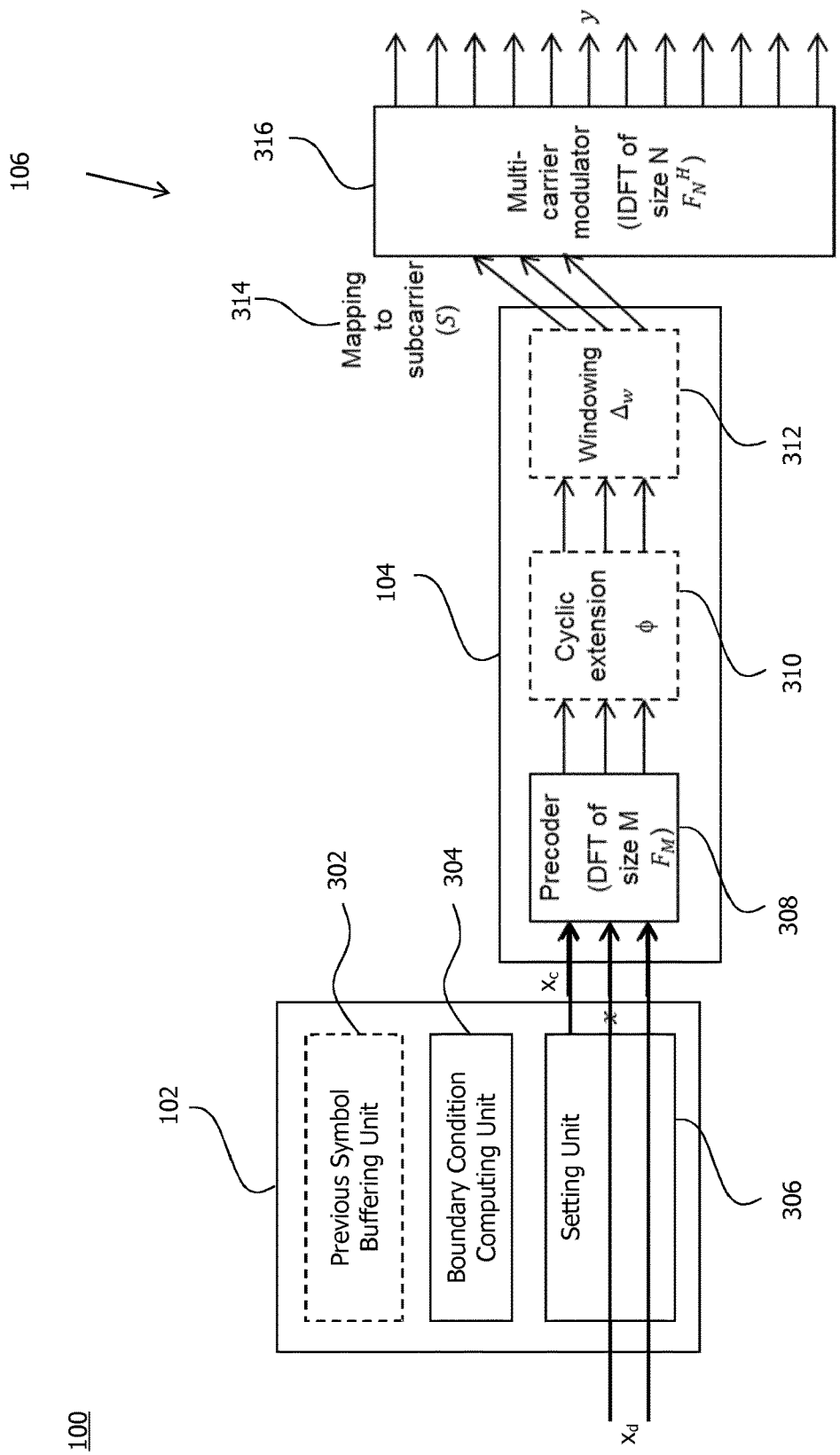
FIG. 3 illustrates a schematic block diagram for a first embodiment of the device of FIG. 1.

A block diagram for a first embodiment of the device 100 is schematically illustrated in FIG. 3. The providing unit 102 includes a boundary condition computing subunit 304 for computing the values of the symbol elements in the subset. The providing unit 102 further includes a setting subunit 306 for setting the symbol elements in the subset to the value computed by the computing subunit 304.

Optionally, the providing unit 102 includes a buffering subunit 302 that buffers the previous symbol or at least one or more symbol elements of the previous symbol. The boundary condition is computed for the current transmission block based on its boundary towards the previous transmission block. The boundary condition is computed based on the buffered previous symbol, e.g., in the absence of a guard interval between subsequent transmission blocks.

In precoded multi-carrier signaling, a multi-carrier modulator 316 in the generating unit 106 is not directly fed with data in the frequency domain. The symbol to be transmitted is precoded by the precoding unit 104. The precoded symbol may be represented by frequency-components resulting from all symbol elements. The precoded symbol is applied to subcarriers of the multi-carrier modulator 316. The multi-carrier modulation 316 performed by the generating unit 106 may be OFDM, Filter Bank Multi-Carrier (FBMC), or any other multi-carrier modulation scheme.

The precoding unit 104 includes a precoder 308. The precoder 308 transforms the symbol provided by the providing unit 102. The precoding transformation performed by the precoder 308 may include any precoding transformation that enables a certain desired property at the output of the multi-carrier modulator 316. By way of example, the precoding is used to generate a low Peak-to-Average Power Ratio (PAPR) signal at the output of the multi-carrier modulator 316.

The precoder transformation 308 may be related to the multi-carrier modulation 316. For example, if the multi-carrier modulator is an OFDM modulator, the precoder may be a Discrete Fourier Transform (DFT), which is illustrated in FIG. 3. The OFDM modulation 316 may include an inverse DFT (IDFT).

More generally, the precoding transformation 308 may include an operation that is inverse relative to an operation included in the multi-carrier modulation 316. The generating unit 106 may include further operations without a corresponding operation in the precoding transformation 308. For example, the generating unit 106 includes a mapping subunit 314 for mapping the frequency-components of the precoded symbol resulting from the precoding unit 104 to certain subcarriers of the multi-carrier modulation 316. In the case of an OFDM modulation 316, the combination of the DFT precoder 308 and the generating unit 106 is also referred to as DFT-Spread OFDM (DFTS-OFDM) or Single Carrier FDMA (SC-FDMA), e.g. for an LTE uplink.

In the first embodiment schematically illustrated in FIG. 3, the precoding unit 104 optionally includes an extension subunit 310 for cyclically extending the precoded symbol of the precoder 308 in the frequency-domain. An optional windowing subunit 312 shapes a frequency window for selectively providing the frequency-components to the modulator 316.

In case of DFTS-OFDM, the output signal for transmission block i can be represented (omitting a subscript i in below matrix notation) by $$y = F_N^H S F_M x, \qquad (1)$$

with $F_M$ and $F_N$ representing the quadratic DFT-matrices of sizes M and N, respectively. The superscript H denotes Hermitian conjugate or conjugate transpose. M is the number of allocated subcarriers and N is the size of the IDFT performed by the OFDM modulator 316. The N×M-matrix S represents the mapping operation 314. The matrix S maps the output of the precoding operation 308 to the M allocated subcarriers. Each column of the matrix S has exactly one value equal to 1 and all other values equal to 0. For an (exemplarily contiguous) mapping of the M subcarriers, the mapping operation 314 can be represented by $$S = \begin{bmatrix} 0_{L_{0_1} \times M} \\ I_M \\ 0_{L_{0_2} \times M} \end{bmatrix},$$

with the M×M identity matrix $I_M$ and $$0_{L_{0_1} \times M} \text{ and } 0_{L_{0_2} \times M}$$

all-zero matrices of size $L_{0_1} \times M$ and $L_{0_2} \times M$, respectively. Alternatively or in partial combination, the mapping operation 314 may be non-contiguous, e.g., an interleaved mapping.

The symbol to be transmitted is represented by an M-element vector x. The symbol x of an exemplary precoded multi-carrier transmission is also referred to as a DFTS-OFDM symbol. An alternative terminology refers to the elements of the symbol x as "symbols".

The output vector y of the generating unit 106 represents the precoded multi-carrier transmission block. The transmission block of a precoded multi-carrier transmission is also referred to as a DFTS-OFDM transmission block.

An optional extension to the device 100 for DFTS-OFDM applies the windowing 312. The windowing reduces out-of-band emissions and can be combined with any embodiment of the technique. In a DFTS-OFDM embodiment of the device 100, the precoded signal $F_M x$ is (optionally after cyclic extension) windowed before being applied to the IDFT 316. The operation of the precoding unit 104 and the generating unit 106 may be represented by $$y = F_N^H S \Delta_w \Phi F_M x, \quad (2)$$

as an extension to Eq. (1) representing an DFTS-OFDM embodiment without windowing.

The optional matrix $\Phi$ defines an example for the cyclic extension of the precoded frequency-components, $$\Phi = \begin{bmatrix} I_M \\ I_{L_e} \quad 0_{L_e \times M - L_e} \end{bmatrix},$$

with $I_{L_e}$ and $0_{L_e \times M - L_e}$ the identity matrix of size $L_e$ and the zero matrix of dimensions $L_e \times M - L_e$, respectively. The cyclic extension repeats $L_e$ of the frequency-components. The optional diagonal matrix $\Delta_w$ represents a window w by means of non-zero elements along its diagonal over $L_w = M + L_e$ frequency-components. Examples of window functions w include Hamming windows and Hanning windows.

The matrix S maps the optionally cyclic-extended and windowed data to the allocated subcarriers, i.e., S has dimension $N \times L_w$.

In a variant of the device 100 without cyclic extension, above parameters are $L_e = 0$ and $L_w = M$ (and $\Phi = I_M$).

After conversion to continues time, the DFTS-OFDM transmission block can be represented (assuming no windowing for simplicity) by $$y(t) = g(t)^T S F_M x, 0 \leq t < N T_s, \quad (1')$$

with the column vector $$g(t) = \begin{pmatrix} [g(t)]_0 \\ \vdots \\ [g(t)]_{N-1} \end{pmatrix},$$

wherein $$[g(t)]_k = \frac{1}{\sqrt{N}} e^{j \frac{2\pi}{N} k \frac{t}{T_s}}, k = 0, 1, \ldots, N-1.$$

The time duration between two samples is $T_s$ (i.e., $1/T_s$ is the sampling rate). The variable t denotes continues time. While above representation of the IDFT assumes a normalized IDFT $$\left( \text{using a normalization factor } \frac{1}{\sqrt{N}} \right),$$

any other normalization may be used. E.g., an IDFT with normalization factor $$\frac{1}{N}$$

can be used as well.

Figure 4:
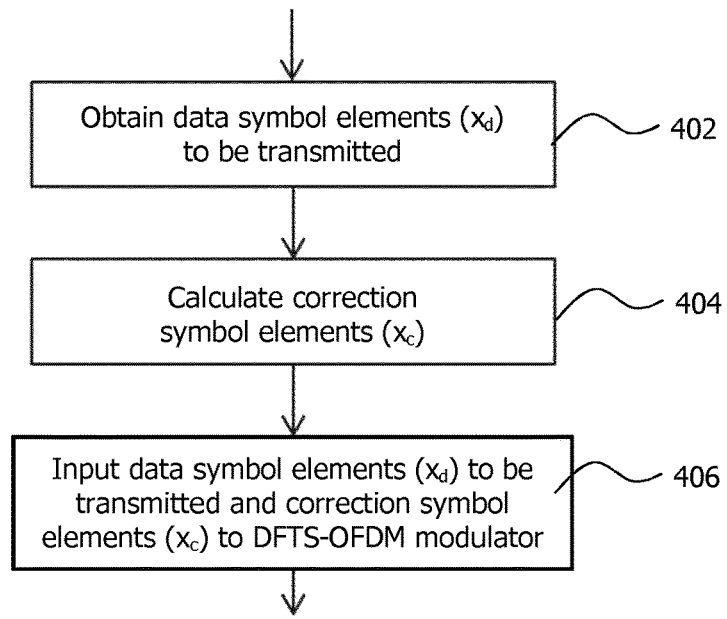
FIG. 4 shows a flowchart of an implementation for a providing step of the method of FIG. 2.

FIG. 4 shows a flowchart for an implementation of the providing step 202. Values $x_d$ representing data to be transmitted are obtained in a substep 402. Values for correction symbol elements $x_c$ are computed in a substep 404. The computed values define the correction symbol elements $x_c$ in the subset of the symbol. The data values define symbol elements outside of the subset.

The method implementation of FIG. 4 may be combined with a DFTS-OFDM modulation, i.e., a DFT precoder 308 in the precoding unit 104 and an OFDM modulator 316 in the generating unit 106. The steps 404 and 406 may be performed by the subunits 304 and 306, respectively.

Figure 5:
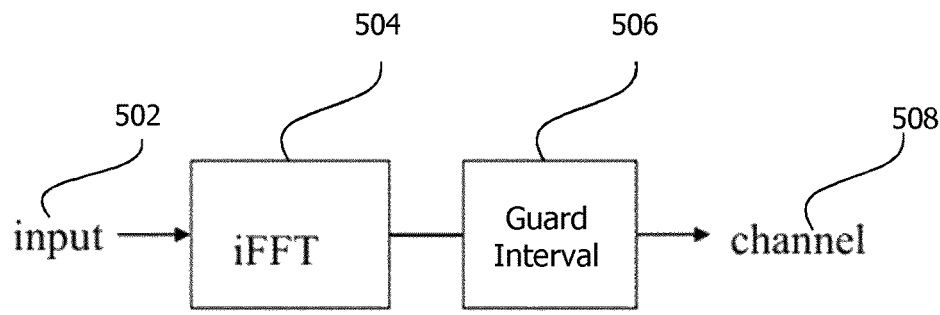
FIG. 5 illustrates a schematic block diagram for a first embodiment of a multi-carrier modulator, which is implementable in the device of FIG. 1.

A first embodiment of the generating unit 106 is shown in FIG. 5. Input 502 to the generating unit 106 is mapped according to the mapping subunit 314. The multi-carrier modulator 316 includes an inverse Fast Fourier Transform (iFFT) subunit 504 for OFDM modulation. The generating unit 106 further includes a guard interval inserting subunit 506 for inserting a guard interval downstream of the iFFT subunit 504. The guard interval may be a cyclic prefix. Output of the generating unit 106 is converted to an analog signal, upconverted to radio frequency, and transmitted on a radio channel 508.

Figure 6:
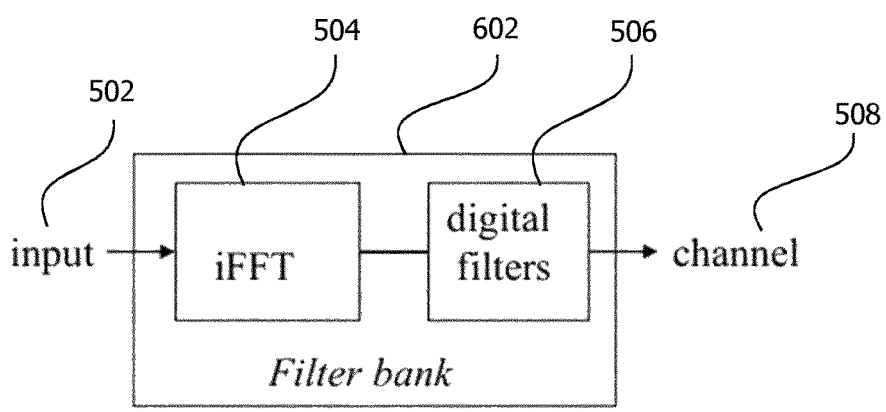
FIG. 6 illustrates a schematic block diagram for a second embodiment of a multi-carrier modulator, which is implementable in the device of FIG. 1.

A second embodiment of the generating unit 106 is shown in FIG. 6. Like reference sign refer to corresponding features. The multi-carrier modulator 316 includes a Filter Bank subunit 602 for FBMC modulation. The generating unit 106 configured for generating the transmission block for an FBMC transmission is preferably combined with a precoding unit 104 configured for a filter bank transformation as the precoding transformation. The combination of a filter bank transformation 308 and an FBMC modulation 316 allows reducing PAPR at the output of the multi-carrier modulator 316. The FBMC modulator 316 does not necessarily insert a guard interval. Digital filters 506 synthesize the time-domain signal output by the iFFT 504. While FIG. 6 illustrates an implementation of an FBMC modulation, other possibilities for creating an FBMC signal exist.

Furthermore, user equipments do not need to be synchronized before they gain access to an FBMC Radio Access Technology, which is an advantage for uplink in a base station-centric RAN and/or in future dynamic-spectrum access systems. FBMC allows, e.g., for so-called cognitive radio, simultaneously carrying out spectrum sensing and transmission functions by the same user equipment.

Figure 7:
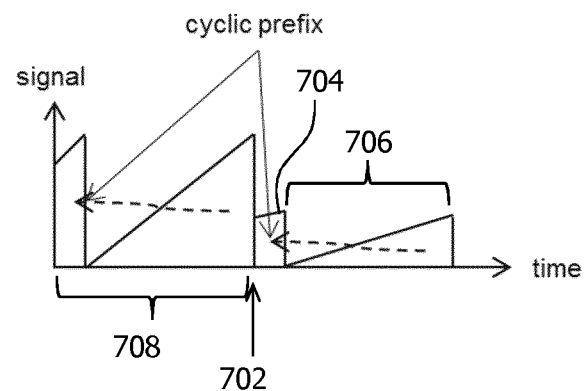
FIG. 7 schematically illustrates a first example for a boundary condition of the transmission block generated by the device of FIG. 1 according to the method of FIG. 2.

The boundary conditions may depend on whether or not a guard interval is used for transmitting the transport block. Alternatively or in addition, the boundary condition may depend on a type of the guard interval. FIG. 7 schematically illustrates a first example for a sequence 700 of transmission blocks including a guard interval. Time is shown on the horizontal axis. A sample index relative to the respective transmission block is shown on the vertical axis.

A boundary condition for a boundary 702 between the guard interval 704 of the currently generated transmission block 706 and the previous transmission block 708 defines the values of the symbol elements in the subset. The guard interval 704 is a cyclic prefix, i.e., the last samples of the transmission block 706 corresponding to the length of the guard interval are inserted at the boundary 702 prior to the beginning of the transmission block 706. The insertion is indicated by a dashed arrow. For the computation 404, the pertinent boundary is the boundary 702.

Figure 8:
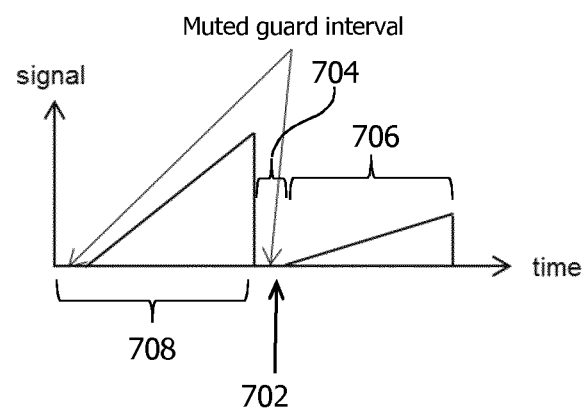
FIG. 8 schematically illustrates a second example for a boundary condition of the transmission block generated by the device of FIG. 1 according to the method of FIG. 2.

FIG. 8 schematically illustrates a second example for a sequence 700 of transmission blocks including a guard interval. Like reference signs indicate corresponding features. The guard interval 704 is a muted guard interval (which is also referred to as a true guard interval). That is, no signal is transmitted during the guard interval 704. A boundary 702 pertinent for the boundary condition is between the muted guard interval 704 and the currently generated transmission block 706. As a consequence, the boundary condition is also fulfilled at the boundary towards the subsequent muted guard interval by virtue of the periodicity of the transmission block 706.

A third example for the guard interval is a predefined (e.g., constant or time-dependent) sequence that is inserted between the previous transmission block 708 and the currently generated transmission block 706. The predefined sequence is also referred to as a "known word". The boundary 702 pertinent for the boundary condition is between the guard interval and the currently generated transmission block 706 (corresponding to the boundary position illustrated in FIG. 8).

Typically a guard interval 704 is added in the time-domain at the beginning (i.e., as a prefix) to the output y of the multi-carrier modulation 316, e.g., to enable simple frequency-domain equalization at the receiver. The guard interval 704 can be a cyclic prefix (i.e., a copy of the last L elements of y, as schematically illustrated in FIG. 7), a true guard interval (i.e., an L-element long zero vector, as schematically illustrated in FIG. 8, a true guard interval can also be inserted after the transmission block) or any other type of guard interval. Independent of the type of the guard interval 704, the signal 700 with guard interval 704 can be represented by $$\tilde{y}=Py=PF_N^H SF_M x, \quad (3)$$

with P the matrix inserting the guard interval 704. An equation corresponding to Eq. (3) holds for the windowed embodiment represented by Eq. (2).

In the following, an exemplary non-limiting computation performed by the providing unit 102 according to the substep 404 is described. The computation 404 is compatible with a DFTS-precoded OFDM modulation performed by the units 104 and 106. The guard interval 704 is a true guard interval.

Similar or other implementations of the substep 404 can be applied to other pre-coded multi-carrier schemes, such as a filter bank-precoded FBMC modulation, a DFT-precoded FBMC modulation, etc. Furthermore, similar or other implementations of the substep 404 can be applied to transmission systems using a cyclic prefix or a known word in the guard interval 704. For these cases, the implementation may be slightly different and the same line of derivation can be applied.

For the exemplary computation 404, the signal value as well as the signal derivatives are zero inside the guard interval 704. The DFTS-precoded OFDM transmission block 706 at the block boundaries (i.e., the boundary 702 at t=0 as well as the other boundary of the transmission block 706 at t=T) is $$y(0)=y(T)=g(0)^T SF_M x,$$

according to Eq. (1'). The r-th derivatives of DFTS-OFDM transmission block y(t) at the block boundaries t=0 and t=T are $$y^{(r)}(0)=y^{(r)}(T)=g^{(r)}(0)^T SF_M x,$$

with the column vector $$g^{(r)}(t) = \begin{pmatrix} [g^{(r)}(t)]_0 \\ \vdots \\ [g^{(r)}(t)]_{N-1} \end{pmatrix}$$

$$[g^{(r)}(t)]_r = \left(j\frac{2}{NT_s}\right)^r e^{j\frac{2\pi k}{N}\frac{t}{T_s}}, \text{ for } k=0,1,\ldots,N-1.$$

To ensure continuity at the transmission block boundary 702, the boundary condition requires that $$y(0)=y(T)=0, \text{ and}$$

$$Y^{(r)}(0)=y^{(r)}(T)=0$$

(since the signal and signal derivatives in the guard interval are zero) for the desired degree of r=0, . . . , R. I.e., R=0 requires continuity, R=1 requires continuous differentiability, and R>1 requires higher-order smoothness. Using the notation $g^{(0)}(t)=g(t)$, the boundary condition may be written as $$g^{(r)}(0)^T SF_M x=0, \text{ for } r=0,1,\ldots,R. \quad (4)$$

For the exemplary computation 404, a boundary condition with R=0 ensures that the DFTS-OFDM transmission block y(t) is continues with the guard interval at the transmission block boundaries. A boundary condition with R=1 ensures that the DFTS-OFDM transmission block y(t) as well as its first derivative $y^{(1)}(t)$ are continues at the transmission block boundaries, and so on.

Eq. (4) can be written in matrix form as $$GSF_M x=0_{R+1}, \quad (4')$$

with $0_{R+1}$ the all-zero column vector of size R+1 and the (R+1)×N matrix $$[G]_{rk} = \left(j\frac{2\pi k}{NT_s}\right)^r, \text{ for } r=0,1,\ldots R \text{ and } k=0,1,\ldots,N-1.$$

To fulfill $GSF_M x=0_{R+1}$, the symbol vector is split into two parts:

$$x = \begin{pmatrix} x_d \\ x_c \end{pmatrix},$$

wherein $x_d$ and $x_c$ are vectors containing the data symbols to be transmitted and correction symbols, respectively. The data part $x_d$ includes the symbol elements with the data to be transmitted. The symbol positions for the data symbol elements may be collectively represented by a first index vector $i_d$.

The correction vector $x_c$ includes the values for the symbol elements in the subset calculated to fulfill the boundary condition, e.g., to ensure continuity at DFTS-OFDM transmission block boundaries. The symbol element positions for the correction symbol elements $x_c$ in the subset are collectively represented by a second index vector $i_c$. The symbol elements $x_c$ in the subset (and the symbol elements $x_d$ outside of the subset) do not have to be contiguous symbol elements in the symbol x.

By way of example, one choice is that $x_c$ comprises the symbols 0 and N−1, or in general symbols located at both ends of the symbol x to be subjected to the precoding unit 104. The data symbol elements $x_d$ are located at symbol element positions in-between.

Using the splitting, Eq. (4') can be written as $$GSF_M x = GSF_M \begin{pmatrix} x_d \\ x_c \end{pmatrix} = GS(F_M^d x_d + F_M^c x_c) \equiv 0,$$

with $F_M^d$ and $F_M^c$ sub-matrices of $F_M$ containing the columns of $F_M$ corresponding to the symbol positions of $x_d$ and $x_c$ in x, respectively. Above equation allows solving for $x_c$, which is the vector defining the symbol elements at positions $i_c$ of x (i.e., in the subset), e.g., to ensure continuity at the transmission block boundaries:

$$x_c = -(GSF_M^c)^\# GSF_M^d x_d, \quad (5)$$

with $(\ )^\#$ denoting the pseudoinverse.

With windowing according to the subunits 310 and 312, the correction vector becomes $$x_c = -(GS\Delta_W \Phi F_M^c)^\# GS\Delta_W \Phi F_M^d x_d. \quad (5')$$

Figure 9:
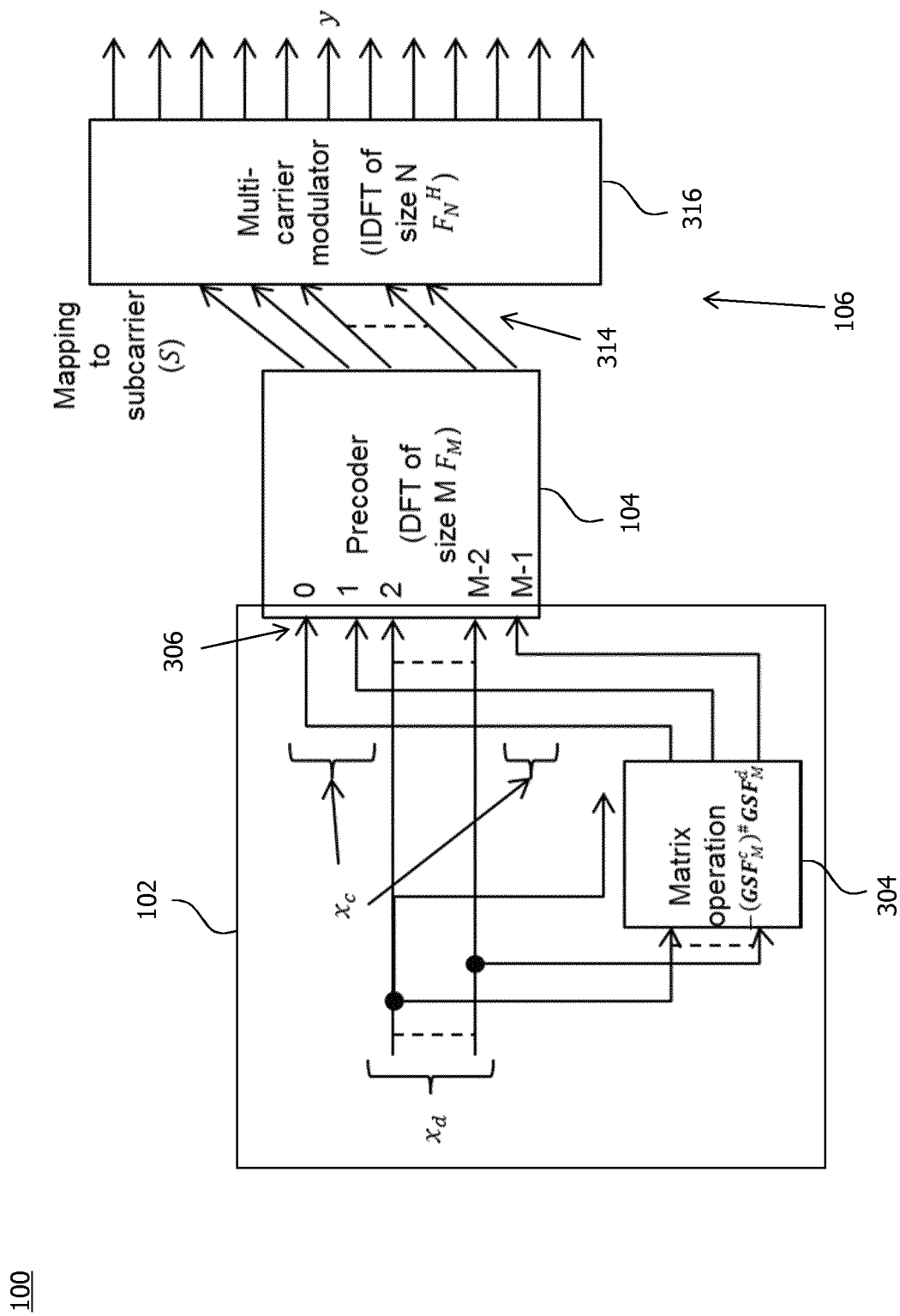
FIG. 9 illustrates a schematic block diagram for a second embodiment of the device of FIG. 1.

FIG. 9 shows a block diagram for a second embodiment of the device 100 for a continuous DFTS-OFDM transmission. Like reference signs indicate corresponding features. The correction symbol elements are located at symbol positions 0, 1, and M−1 of the symbol x (i.e., $i_c$=[0 1 M−1] and $i_d$=[2 3 . . . M−2]). Consequently, $F_M^d$ contains the columns 2, 3, . . . , M−2 of $F_M$, and $F_M^c$ contains the columns 0,1,M−1 of $F_M$.

Examples for symbol element positions of symbol elements used for data symbols ($i_d$) and correction symbols ($i_c$) are shown in the table below. In these examples, the parameter R is equal to the number of correction symbol elements minus one. Other settings of R are possible.

| R | $i_d$ | $i_c$ |
|---|---|---|
| 0 | [1 2 . . . M − 1] | [0] |
| 1 | [2 3 . . . M − 1] | [0 1] |
| 2 | [2 3 . . . M − 2] | [0 1 M − 1] |
| 3 | [2 3 . . . M − 3] | [0 1 M − 2 M − 1] |
| 4 | [3 4 . . . M − 3] | [0 1 2 M − 2 M − 1] |

Figure 10:
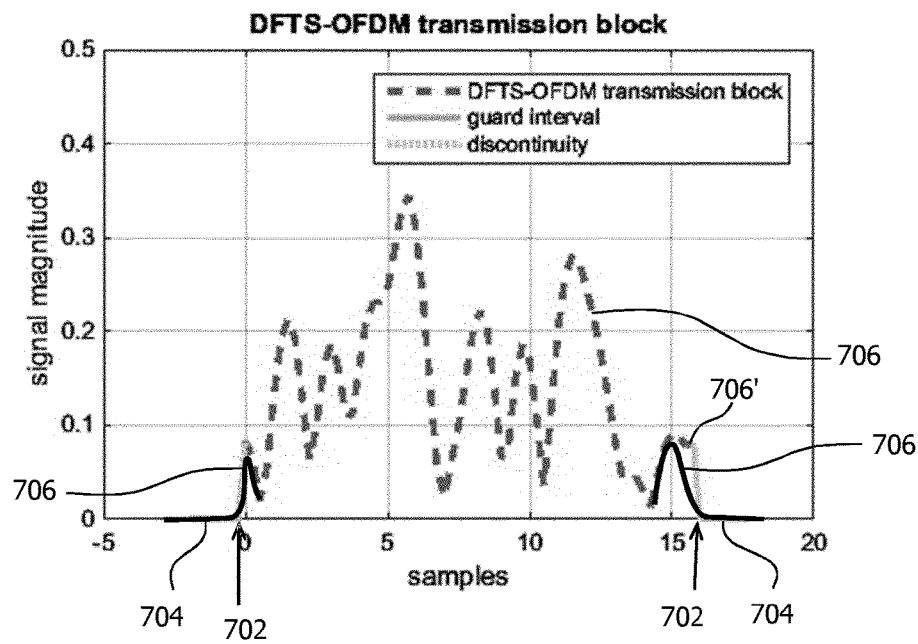
FIG. 10 schematically illustrates an example for a transmission block with adjacent guard intervals.

FIG. 10 schematically illustrates a time-domain signal 1000 of transmission block 706. As schematically illustrated by solid lines at the boundaries 702, the transmission block is a smooth function of time at the boundaries 702 towards the muted guard interval 704. That is, the DFTS-OFDM transmission block 706 is smoothly embedded in-between two zero-signals 704 (e.g., one before and one after the DFTS-OFDM transmission block 706). The corresponding signal 706' without the contribution of the correction values is schematically illustrated for reference.

Figure 11:
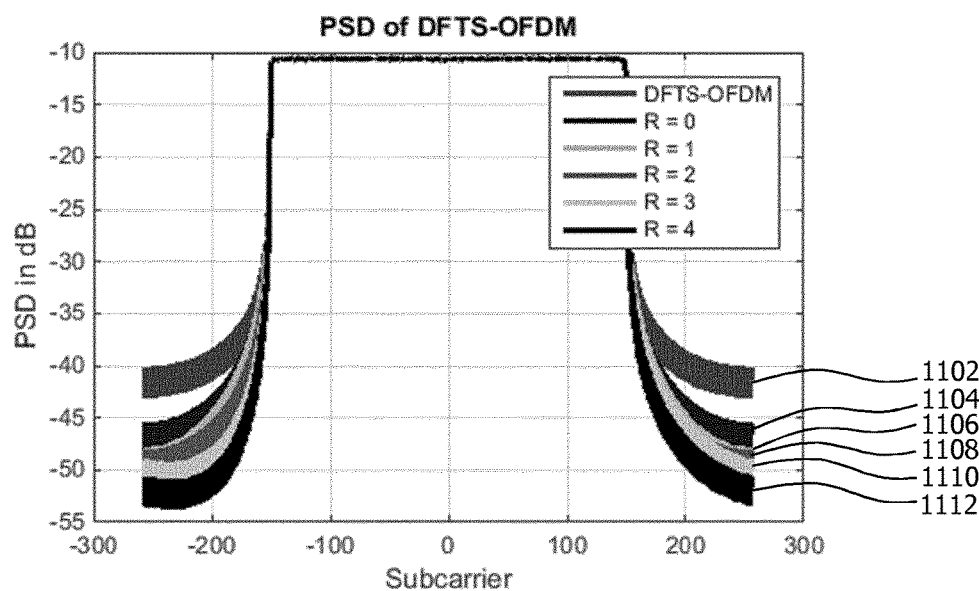
FIG. 11 shows graphs of power spectra of a radio transmission resulting from different parameters of the method of FIG. 2.

FIG. 11 shows simulation results 1100 for the Power Spectrum Density (PSD) of the second embodiment of the device 100 for DFTS-OFDM transmission with and without continuous DFTS-OFDM transmission block boundaries. The graph 1102 of the PSD for a conventional DFTS-OFDM transmission is shown for reference. The graphs 1104 to 1112 result for a DFTS-OFDM transmission according to the second embodiment with boundary conditions ranging from R=0 (signal itself is continuous) to R=4 (signal and first 4 derivatives are continuous). The system parameters are iFFT size N=512, number of used subcarriers M=300, 16QAM modulation per symbol, and a subcarrier bandwidth of 15 kHz, so that $$T_s = \frac{1}{N \cdot 15 \text{ kHz}} = 130 \text{ ns}.$$

As has become apparent from above description of exemplary embodiments, the technique allows reducing out-of-band emissions in precoded multi-carrier signaling. At least some embodiments enable using shorter (e.g., less steep) filters, which allow reducing the complexity in a transmitter. Shorter filters also enable the use of shorter guard intervals leading to less overhead in the signaling.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A device for generating a transmission block for a precoded multi-carrier radio transmission, the device comprising:
   processing circuitry; and
   memory containing instructions executable by the processing circuitry, whereby the device is operative to:
      provide a symbol that includes a plurality of symbol elements, wherein a subset of the plurality of symbol elements is set to values depending on a boundary condition for the transmission block;
      precode the symbol; and
      generate the transmission block by multi-carrier modulation of the precoded symbol,
      wherein the boundary condition relates to a boundary value of the transmission block at a boundary in a time domain that ensures continuity across transmission block boundaries in the time domain,
      wherein the continuity across transmission block boundaries in the time domain is ensured by inserting a guard interval including a zero symbol element adjacent to the transmission block, and wherein the boundary condition further relates to a boundary between the transmission block and the guard interval.

2. The device of claim 1, wherein the multi-carrier modulation includes an Orthogonal Frequency-Division Multiplexing (OFDM) modulation or a Filter Bank Multi-Carrier (FBMC) modulation.

3. The device of claim 1, wherein the precoding the symbol includes a Discrete Fourier Transform (DFT) or a Filter Bank Transform (FBT).

4. The device of claim 1, wherein:
the precoding the symbol comprises a spectral analysis; and
the multi-carrier modulation comprises a spectral synthesis.

5. The device of claim 1, wherein the subset of the plurality of symbol elements includes symbol elements adjacent to a boundary of the symbol.

6. The device of claim 1:
wherein a cyclic prefix is inserted between a previous transmission block and the generated transmission block; and
wherein the boundary condition further relates to a boundary between the previous transmission block and the cyclic prefix.

7. The device of claim 1, wherein symbol elements in the subset of the plurality of symbol elements are not contiguous in the symbol to be precoded.

8. The device of claim 1, wherein data to be transmitted is encoded in symbol elements outside of the subset of the plurality of symbol elements.

9. A method of generating a transmission block for a precoded multi-carrier radio transmission, the method comprising:
providing a symbol including a plurality of symbol elements, wherein a subset of the plurality of symbol elements is set to values depending on a boundary condition for the transmission block;
precoding the symbol; and
generating the transmission block by multi-carrier modulation of the precoded symbol,
wherein the boundary condition relates to a boundary value of the transmission block at a boundary in a time domain that ensures continuity across transmission block boundaries in the time domain,
wherein the continuity across transmission block boundaries in the time domain is ensured by inserting a guard interval including a zero symbol element adjacent to the transmission block, and wherein the boundary condition further relates to a boundary between the transmission block and the guard interval.

10. The method of claim 9, wherein performing the multi-carrier modulation includes performing an Orthogonal Frequency-Division Multiplexing (OFDM) modulation or a Filter Bank Multi-Carrier (FBMC) modulation.

11. The method of claim 9, wherein performing the precoding includes performing a Discrete Fourier Transform (DFT) or a Filter Bank Transform (FBT).

12. The method of claim 9:
wherein the precoding the symbol comprises performing a spectral analysis; and
wherein performing the multi-carrier modulation comprises performing a spectral synthesis.

13. The method of claim 9, wherein the subset of the plurality of symbol elements includes symbol elements adjacent to a boundary of the symbol.

14. The method of claim 9:
wherein a cyclic prefix is inserted between a previous transmission block and the generated transmission block; and
wherein the boundary condition further relates to a boundary between the previous transmission block and the cyclic prefix.

15. The method of claim 9, wherein symbol elements in the subset of the plurality of symbol elements are not contiguous in the symbol to be precoded.

16. The method of claim 9, wherein data to be transmitted is encoded in symbol elements outside of the subset of the plurality of symbol elements.

17. The method of claim 16, wherein the data is encoded by a channel code providing forward error correction.

18. A non-transitory computer readable recording medium storing a set of computer-executable instructions for generating a transmission block for a precoded multi-carrier radio transmission, the set of computer-executable instructions causing processing circuitry of one or more computing devices to:
provide a symbol including a plurality of symbol elements, wherein a subset of the plurality of symbol elements is set to values depending on a boundary condition for the transmission block;
precode the symbol; and
generate the transmission block by multi-carrier modulation of the precoded symbol,
wherein the boundary condition relates to a boundary value of the transmission block at a boundary in a time domain that ensures continuity across transmission block boundaries in the time domain,
wherein the continuity across transmission block boundaries in the time domain is ensured by inserting a guard interval including a zero symbol element adjacent to the transmission block, and wherein the boundary condition further relates to a boundary between the transmission block and the guard interval.

* * * * *